United States Patent
Ekhart et al.

(10) Patent No.: US 6,475,541 B1
(45) Date of Patent: Nov. 5, 2002

(54) BATTER-COATED FOOD PRODUCTS

(75) Inventors: Peter Frank Ekhart, Amsterdam; Johannes Bernardus Lenssinck, Veenendaal, both of (NL)

(73) Assignee: Aventis CropScience GmbH, Frankfurt (DE)

( * ) Notice: Subject to any disclaimer, the term of this patent is extended or adjusted under 35 U.S.C. 154(b) by 0 days.

(21) Appl. No.: 09/567,719

(22) Filed: May 10, 2000

(30) Foreign Application Priority Data

May 12, 1999 (DE) .......................... 199 21 681

(51) Int. Cl.⁷ ............................... A21D 10/04
(52) U.S. Cl. ..................... 426/94; 426/653; 426/552
(58) Field of Search .................... 127/32; 800/262, 800/263, 278, 284; 426/94, 653, 552, 555, 553, 554, 578, 622

(56) References Cited

U.S. PATENT DOCUMENTS 5,104,669 A 4/1992 Wolke et al.

FOREIGN PATENT DOCUMENTS

| CA | 2231774 | 3/1997 |
|----|---------|--------|
| EP | 0 157 800 | 10/1987 |
| WO | WO 93/03634 | 3/1993 |
| WO | WO 96/34968 | 11/1996 |
| WO | WO 97/1118 | 3/1997 |

*Primary Examiner*—Keith Hendricks
(74) *Attorney, Agent, or Firm*—Frommer Lawrence & Haug LLP

(57) ABSTRACT

The invention relates to a batter mix comprising genetically modified potato starch (GMPS), a process for the production of said batter mix, the use of said batter mix for the production of food products comprising said batter mix, preferably batter coated food products, which may be pre-fried, frozen and then preferably cooked in a microwave oven, whereby the use of the genetically modified potato starch in the batter mix compositions results in unexpected superior crispness of the food product.

9 Claims, No Drawings

BATTER-COATED FOOD PRODUCTS

The invention relates to a batter mix comprising genetically modified potato starch (GMPS), a process for the production of said batter mix, the use of said batter mix for the production of food products, preferably batter coated food products, which may be pre-fried, frozen and then preferably cooked in a microwave oven, whereby the use of the genetically modified potato starch in the batter mix compositions results in unexpected superior organoleptic properties of the food product, especially crispness.

Batter coated fried foods are broadly used. Among the most popular batter coated foods are fried chicken, fish and other meat products. EP-B1-0157800 relates to batters containing high amylose flour extracted from corn and wheat suitable for microwaveable pre-fried foodstuffs. Batter formulations for coating of foodstuff are described, consisting of starch containing products, egg solids, baking powder, cream, preservatives, seasonings, coloring and milk solids. The starch ingredient consists of a high amylose flour containing at least 50% amylose (on total starch) and other starches.

U.S. Pat. No. 5,104,669 relates to microwaveable flour-starch based food product and describes a mixture for a flour-starch-based food product, that heats evenly from a frozen condition, when exposed to microwave energy. The dough formula described herein includes 15–60% high amylose starch extracted from corn besides the flour and water.

WO 93/03634 A1 teaches a microwaveable coating based on starch and cellulose. or the purpose of obtaining crispy food following to heating after previous cooling, a predust formula consisting of high amylopectin starch and methyl cellulose is described, together with a batter formulation consisting of high amylose starch (40–50%), flour (25–40%) and cellulose gum (1–5%).

Many food products cooked by means of microwaving or baking do not show great qualitative differences. Frozen pre-fried foodstuffs however, exhibit great disadvantages when cooked final products are compared, which have been fried, baked or microwaved. In particular, microwaved products show great tendency to be undesirably soggy. There are at least two reasons known for that effect. Firstly, during microwaving, the moisture in the food piece is driven outwards towards the surface, which can cause the food piece to become soggy. During frying or baking, the outer coating receives the most exposure to high temperatures, thus providing a crispy outer coating. Secondly, microwave ovens are limited to a cooking temperature that does not exceed the boiling point of the water and thus, oil retained on or in a food piece after pre-frying will not continue to cook the food piece resulting in a different temperature gradient within the food piece. For example, crispness is an important criterion of pre-fried batter-coated food products which are cooked in a microwave oven.

Beside the fact that a batter mix which provides a crispy pre-fried batter-coated food piece after microwaving is highly desired, the mix must additionally provide other properties in order to obtain an acceptable food product. For example, the interface between the batter coating and food piece after microwaving should preferably be undistinguishable. The crispness of a batter-coated food piece becomes overshadowed as the interface worsens by going from thin and dry to floury, bready and finally to pasty. Avoidance of oil-weepage is also an important factor. Fluid migration during freezing or microwaving due to gravity may result in the pooling or fluids on the underface of the product resulting in a food product which is soggy beneath crispy coating. The batter should also provide good adhesion and cohesion in order to sustain the pressure of moisture. Some batters produce a lacy uneven coating on food pieces. Such a trait is also undesirable because it leads to crumbly coatings. Additionally, the batter should provide a food product with an acceptable and appealing final color.

Based on the great popularity of batter coated and optionally pre-fried food products, there are a number of various batter formulations and coating procedures known but the use of a genetically modified potato starch for the preparation of batter mixes has not been reported up to now.

Therefore, there is a strong need for the availability of batter mixes resulting in food products, in particular, batter-coated food products having improved features like superior crispness, improved taste and mouth-feeling.

It is well known that starch is composed of two fractions, the molecular arrangement of one being linear and the other being branched. The linear fraction of starch is known as amylose and the branched fraction as amylopectin. Methods for separating starch into these two components are known. Starches from different sources, e.g. potato, corn, tapioca, and wheat etc. are characterized by different relative proportions of the amylose and amylopectin components. Some plant species have been genetically developed by classical breeding which are characterized by a large preponderance of the one fraction over the other. For instance, certain varieties of corn which normally contain 22–28% amylose have been developed which yield starch composed of over 50% amylose. These hybrid varieties have been referred to as high amylose corn or amylomaize.

WO 97/11188 A1 teaches genetically modified potato plants producing a high amylose starch of up to about 70% and a decreased phosphate content of about only 10%. WO 97/11188 A1 relates to nucleic acid molecules which code for a starch-granule-bound protein, and a process and recombinant DNA molecules for the production of transgenic plants which synthesize a modified starch with altered viscosity properties and an altered (i.e. decreased) phosphate content compared to starch obtainable from non-transgenic potato plants. The introduction of the coding sequences of plasmids p35S-anti-RL and p35SH-anti-BE into the genome of potato plants is described. The plasmids had been introduced into the genome of the potato plant by using Agrobacterium tumefaciens mediated plant transformation. Plants had been regenerated and selected for the level of reduction of the expression of branching enzyme and RL-enzyme (R1 protein).

Surprisingly, it has now been found that the application of a certain genetically modified potato starch in batter mix compositions results in the improvement of food products exhibiting superior features, like improved organoleptic properties, in particular increased crispness, especially of microwaved pre-frozen food products prepared by use of said batter mix, in particular being coated with a batter mix according to the invention. Furthermore, the use of genetically modified starch in comparison to chemically modified starches is highly advantageous as complex and energy-consuming modification of the starch is avoided. It was additionally surprising, that especially pre-fried or fried comestibles exhibit a superior crispness after cooking in a microwave oven when prepared with the batter mix of the invention. The crispness maintains, even when the comestible is warmed up.

Therefore, the present invention relates to a batter mix, wherein a genetically modified potato starch (GMPS, GMP starch) having a phosphate content less than 85%, preferably less than 50%, more preferably less than 30% and most preferably less than 15% of the corresponding potato starch obtainable from a naturally occurring (i.e., a genetically not modified potato plant) plant is mixed with suitable batter mix ingredients. In this context, the total amount of phosphate in the starch is generally less than 11 nmol glucose-6-phosphate (G6P) per mg starch, preferably less than 7 nmol G6P/mg, more preferably less than 3,5 nmol G6P/mg, and most preferably less than 2 nmol G6P/mg starch. The phosphate content of the starch is to be identified according to the method described in example 8 b of WO 97/11188 A1 via determination of the glucose-6-phosphate amount per mg starch by an enzymatic assay using G6P-dehydrogenase. In another embodiment of instant invention the GMPS exhibits additionally an increased amylose content of at least 25%, preferably about 25–45% and in particular about 30–40% by weight of the total amount of starch. Usually, the amylose content of starch obtained from non genetically modified potato plants is about 20% by weight. The amylose content is determined according to the method of Hovenkamp-Hermelink et al. (Hovenkamp-Hermelink et al., 1988, Potato Research 31: 241–246). In still another preferred embodiment of instant invention the GMPS exhibits in addition a gel strength of about 90–160 g, preferably of about 100–160 g determined by a Texture Analyzer TA-XT2 (Stable Micro Systems, UK) as described below.

In the context of the present invention the term "batter mix" means a mix of GMPS and other ingredients which are suitable in food industry for the preparation of batter mix compositions. The term "batter mix" comprises, if not otherwise stated, dry and/or wet (i.e., aqueous) batter compositions, e.g., batters, dusted coatings, double coatings, films, film-coatings, glazes and the like. Usually, wet batter mixes comprise a dry matter or a GMPS of about 5 to 60%, preferably about 10 to 50% and most preferably about 15 to 40% by weight, depending on the viscosity and the use of the wet batter composition. Accordingly, the batter mix of the invention can be used for all coating applications of comestibles, for example the said films, glazes, dusted coatings, and double coatings.

The term "genetically modified potato starch" (GMPS, GMP-starch) as used herein means a starch extracted from a potato plant that had been modified by use of genetic engineering with respect to its phosphate content and/or side chain distribution, preferably exhibiting an decreased phosphate content and/or increased amylose/amylopectin ratio compared to a naturally occurring potato starch. It is well known in the art how to obtain such GMPS by a large number of references regarding the production of transgenic potatoes by use of suitable genetic elements. GMPS are known, for example, from WO 90/12876 A1, WO 91119806 A1, WO 92/11375 A1, WO 92/11376 A1, WO 92/11382 A1, WO 92/14827 A1, WO 94/09144 A1, WO 94128149 A1, WO 95/04826 A1, WO 95/07355 A1, WO 95/26407 A1, WO 95/34660 A1, WO 95/03513 A1, WO 96/15248 A1, WO 96/19581 A1, WO 96/27674 A1, WO 96/34968 A1, WO 97/04112 A1, WO 97/04113 A1, WO 97/11188 A1, WO 97/20040 A1, WO 97/42328 A1, WO 98/11181 A1, WO 98/11228 A1, WO 98/37213 A1, WO 98/37214 A1, CA 2,061,443, DE 19836098.3, EP 0 455 316, EP 0 703 314, EP 0 737 777, EP 0 779 363, and U.S. Pat. No. 5,300,145. WO 97/11188 A1 extensively describes the preparation of the GMPS used in the examples hereinafter. Therefore, the contents of WO 97/11188 A1 are hereby explicitly incorporated by reference.

Furthermore, the invention relates to a process for the production of a batter mix according to the invention, wherein said genetically modified potato starch is mixed with suitable batter mix ingredients in order to obtain a dry or wet batter mix composition, and also the use of genetically modified potato starch (GMPS) for the production of batter mix compositions suitable for the preparation of food products or batter coated food products.

"Suitable batter mix ingredients" are well known in the art and encompass natural occurring starches and/or flours mainly from corn, wheat, potato, tapioca, rice, genetically modified starches and/or flours from said crops other than potato, chemical and/or physical treated or modified starches and/or flours from said crops, cellulose gums or derivatives (ethers etc.), dextranes, in food industry suitable oligo-,di- and monosaccharides, inorganic and/or organic salt, flavors, stabilizers, egg solids, baking powder, cream of tartar, seasonings, coloring matter, milk solids, emulsifiers, spices, and additives.

The dry batter mixes are either directly used for predust or dust application of the comestible or are suspended in water so as to obtain the desired viscosity of a wet batter mix whereupon the batter mix is applied to the food pieces by means of a dip, spray or cascade technique and the like.

Another embodiment of the invention relates to the use of the batter mix according to the invention for the preparation of food products, preferably a batter coated food product. In particular, the food product is selected from the group consisting of red-meat, poultry, fish, vegetables, fruits, mushrooms, and cheese. Preferably, the batter coated food product will be exposed to microwave radiation before final food consumption which can be done for example in a microwave oven.

A further embodiment of the invention is the use of the batter mix of the invention for the improvement of crispness of a frozen comestible, in particular a batter-coated comestible, after microwave-heating or the improvement of crispness of a batter-coated comestible after oven treatment.

Still another embodiment of the invention is the food product comprising a batter mix according to the invention, or a food product which can be produced by use of the batter mix according to the invention, preferably a food product coated by a batter mix of the invention, and more preferred a food product selected from the group consisting of meat, poultry, fish, vegetables, fruits, mushroom, or cheese, and the process for the preparation of the said food products by use of the batter mix of the invention.

Before coating and/or frying, the batter coated food products may be also coated with a breading such as cereals, corn meal, corn flakes, cracker crumbs, bread crumbs, biscuit crumbs or the like, preferably having an average particle size of about 0.05 to 3.0 mm.

Finally, the invention relates to a process for the production of a food product according to the invention, wherein a batter mix according to the invention is used for the preparation of said food product, which is preferably selected from the group consisting of red-meat, fish, vegetables, fruits, mushrooms, and cheese and more preferred a batter coated food product.

Methods: Determination of the Gel Formation Properties of Starch

To determine gel strength using a Texture Analyzer, 2 g of starch is gelatinized in 25 ml of water (cf. measurement using RVA) and then kept sealed air-tight for 24 h at 25° C. The samples were fixed under the probe (round piston) of a Texture Analyzer TA-XT2 (Stable Micro Systems) and the gel strength was determined using the following parameter settings:

Test speed 0.5 mm/s

Depth of penetration: 7 mm

Contact surface (of the piston) 113 mm$^2$

Pressure/contact surface 2 g

The following examples shall illustrate the invention and do not limit the invention.

The GMPS used in the following Examples is a genetically modified potato starch, as described in example 10 of WO 97/11188, which is obtainable from PlantTec GmbH, Potsdam, Germany. If not otherwise stated, the following percentage values are percentage by weight (w/w).

EXAMPLE 1

Preparation of Chicken Nuggets

For the preparation of chicken nuggets several dry mixes were prepared by mixing the ingredients, as depicted in table 1, to a total mass of 3 kg.

TABLE I

Composition of the batter mixes used

| No. | WF [%] | PA [%] | BC0 [%] | BC9 [%] | BB [%] | CF [%] | GMP [%] | YCF [%] | KC [%] | SB [%] | SP [%] | Total [%] |
|---|---|---|---|---|---|---|---|---|---|---|---|---|
| 1 | 65.0 | 20 | | | | | | 8 | 6 | 0.5 | 0.5 | 100 |
| 2 | 65.0 | | 20 | | | | | 8 | 6 | 0.5 | 0.5 | 100 |
| 3 | 65.0 | | | 20 | | | | 8 | 6 | 0.5 | 0.5 | 100 |
| 4 | 65.0 | | | | 20 | | | 8 | 6 | 0.5 | 0.5 | 100 |
| 5 | 65.0 | | | | 10 | 10 | | 8 | 6 | 0.5 | 0.5 | 100 |
| 6 | 70.0 | | | | | | 15 | 8 | 6 | 0.5 | 0.5 | 100 |
| 7 | 65.0 | | | | | | 20 | 8 | 6 | 0.5 | 0.5 | 100 |
| 8 | 60.0 | | | | | | 25 | 8 | 6 | 0.5 | 0.5 | 100 |

WF = Wheat flour Edelweiss (Meneba, Rotterdam, The Netherlands)
PA = Perfectamyl P10-X6% (a distarch phosphate potato starch, AVEBE, Veendam, The Netherlands)
BC0 = C Batter Crisp 05534 (an oxidized starch product containing gluten, Cerestar, Neuilly-sur-Seine, France)
BC9 = C Batter Crisp 90230 (a 50% amylose maize, Cerestar, Neuilly-sur-Seine, France)
BB = Batterbind SC (an acetylated distarch adipate and oxidized starch National Starch, Bridgewater, New Jersey, USA)
CF = Crisp Film (an acetylated high amylose maize starch, National Starch, Bridgewater, New Jersey, USA)
GMP = GMP-Starch (PlantTec, Potsdam, Germany)
YCF = Yellow corn flour (Meneba, Rotterdam, The Netherlands)
KC = Kitchen salt
SB = Sodium Bicarbonate
SP = Sodium Acid Pyrophosphate For a batter preparation, 1 kg of dry mix was solubilized in 1.5 kg water under stirring, yielding a dry matter of 40%.

Chicken breast was grinded and the other ingredients were added to the grinded meat, which was stored at 0° C. for 24 hours under stirring at low speed. A mix of spices and starch was added and the mix was homogenized for another 10 minutes. In a mould, 16.7 g (±0.3 g) square pieces of chicken meat were moulded. The shaped pieces were dusted with the dry batter mix and dipped in the batter. Subsequently these battered meat pieces were deep fat fried at 180–185° C. for approximately 1.5 min.

TABLE II

Brine formulation and spices for pre-treatment of chicken breast

| Ingredients: | % |
|---|---|
| Chicken breast | 80 |
| Phosphate | 0.2 |
| Kitchen salt | 1.7 |
| Water | 15.7 |
| Wheat Starch | 2.0 |
| Spices | 0.4 |

After frying the nuggets were cooled at −40° C. for 48 hours and stored at −20° C. The stored nuggets were tested on resistance against microwave treatment by heating the nuggets at 750 W for 4 minutes, to a core temperature of 85–90° C. The nuggets were weighted before and after heating. The homogeneity of heating, within a batch of nuggets, was checked by sticking a Pt-electrode in the nuggets after heating and this appeared to be sufficient.

Organoleptic parameters were analyzed by an expert panel. The nuggets were tested directly after heat treatment.

In order to evaluate the effect in weight gain of the meat during the preparation, the weight balance was determined and qualitative remarks concerning the microwave heated chicken nuggets were collected in table III.

TABLE III

Weight balance and qualitative remarks (crispness) of the chicken nugget preparations with different batter mixes and without batter

| Batter mix No.[1] | Weight gain [%][2] | Crispness |
|---|---|---|
| 1 | 108.8 | Rubbery-Hard |
| 2 | 106.7 | Rubbery |
| 3 | 109.7 | Rubbery-Soft |
| 4 | 106.2 | Rubbery-Hard |
| 5 | 106.9 | Rubbery |
| 6 | 114.7 | Rubbery-Soft |
| 7 | 110.7 | Rubbery-Soft |

TABLE III-continued

Weight balance and qualitative remarks (crispness) of the chicken nugget preparations with different batter mixes and without batter

| Batter mix No.[1] | Weight gain [%][2] | Crispness |
|---|---|---|
| 8 | 111.4 | Hard |
| Without batter | 87.6 | n.d. |

[1]The numbers of the batter mix refer to table I.
[2]Weight gain compared to the starting material (100%).
n.d.: not detected The attributes to express the sensorial experience of the crispness are ranging from soggy, soft, rubbery to hard.

The data on the degree of fat adsorption in the coating after frying is collected in table IV.

TABLE IV

Degree of fat absorption on dry matter in the isolated coatings

| Batter mix No.[1] | Dry matter [%] | Fat content on dry matter [%] |
|---|---|---|
| 1 | 49.6 | 23.8 |
| 2 | 50.9 | 25.7 |
| 3 | 49.8 | 29.5 |
| 4 | 51.0 | 25.1 |
| 5 | 49.7 | 25.2 |
| 6 | 45.1 | 43.9 |
| 7 | 48.3 | 32.7 |
| 8 | 45.6 | 30.9 |

[1]The numbers of the batter mix refer to table I.

The three GMPS batter formulation No's 6 to 8 according to present invention do clearly show a significant higher fat uptake compared to the commercial batters.

EXAMPLE 2

Preparation of Red Meat and Fish Nuggets

For the preparation of the red meat and fish nuggets (cf. Example 3) several dry batter mixes were prepared as depicted in table V to a total mass of 3 kg.

TABLE V

Composition of various batters used for red meat and fish nuggets

| No. | WF [%] | PA [%] | BB [%] | CF [%] | GMP [%] | YCF [%] | KC [%] | SB [%] | SP [%] | Total [%] |
|---|---|---|---|---|---|---|---|---|---|---|
| 1 | 65.0 | | | | 20 | 8 | 6 | 0.5 | 0.5 | 100 |
| 2 | 60.0 | | | | 25 | 8 | 6 | 0.5 | 0.5 | 100 |
| 3 | 65.0 | 20 | | | | 8 | 6 | 0.5 | 0.5 | 100 |
| 4 | 60.0 | 25 | | | | 8 | 6 | 0.5 | 0.5 | 100 |
| 5 | 65.0 | | 11 | 9 | | 8 | 6 | 0.5 | 0.5 | 100 |
| 6 | 60.0 | | 13 | 12 | | 8 | 6 | 0.5 | 0.5 | 100 |
| 7 | 85.0 | | | | | 8 | 6 | 0.5 | 0.5 | 100 |

WF = Wheat flour Edelweiss (Meneba, Rotterdam, The Netherlands)
PA = Perfectamyl P10-X6% (AVEBE, Veendam, The Netherlands)
BB = Batterbind SC (National Starch, Bridgewater, New Jersey, USA)
CF = Crispcoat UC (a high amylose maize starch mixed tapioca dextrine, National Starch, Bridgewater, New Jersey, USA)
GMP = GMP-Starch (PlantTec GmbH, Potsdam, Germany)
YCF = Yellow corn flour (Meneba, Rotterdam, The Netherlands)
KC = Kitchen salt (including 1.5% $NaNO_2$)
SB = Sodium Bicarbonate
SP = Sodium Acid Pyrophosphate For a batter preparation, 1 kg of the dry batter mix was solubilized in 1.5 kg water under stirring, yielding a dry matter of 40%.

2. A. Double Fried Beef Nuggets

The low fat beef meat was injected with a brine with the composition as indicated in table VI. Subsequently the beef was mechanically tenderized, chopped (coarse), mixed with the remaining ingredients, vacuum packed and stored overnight at +10° C. Finally the comminuted beef was frozen at −10° C. and cut into square 13–15 gram pieces just before battering at −2 to 0° C.

The beef cubes were pre-dusted and dipped into the batter, fried for 30 seconds, dusted and dipped in the batter again and fried for 4 minutes at 180–185° C. In case of the breaded version the second frying step was only executed for 3 minutes. After 24 hours of cooling at −20° C. the nuggets were wrapped in polythene bags and stored at −20° C.

TABLE VI

Brine formulation and spices for pre-treatment of red meat

| Ingredients | [%] |
|---|---|
| Comminuted Beef | 86.6 |
| Brine ingredients | |
| Phosphate | 0.15 |
| Kitchen salt | 0.65 |
| Water | 10 |
| Potato Starch | 1.5 |
| Ascorbate | 0.1 |
| Spices | |
| White pepper | 0.1 |
| Lavas | 0.2 |
| Bouillon powder | 0.7 |

2. B. Single Fried and Oven Treated Beef Nuggets

A farce was made by blending and comminuting low fat beef with the processing aids as indicated in table VII. Subsequently the red meet filling was prepared by comminuting a batch of low-fat beef adding and mixing the farce and other ingredients as indicated in table VII.

TABLE VII

Ingredients of the beef filling

| Farce | [%] |
|---|---|
| Beef | 13.2 |
| Phosphate | 0.1 |
| Salt including 15% NaNO$_2$ | 0.3 |
| Water | 6.8 |
| Ascorbate | 0.1 |
| Potato Starch | 1.0 |
| Beef | |
| Beef | 72.2 |
| Salt including 15% NaNO$_2$ | 0.35 |
| Phosphate | 0.1 |
| Ascorbate | 0.1 |
| Potato starch | 1.5 |
| White pepper | 0.1 |
| Bouillon powder | 0.75 |
| Lavas | 0.2 |

Finally the beef cubes were dusted in the dry batter mix, dipped into the batter twice and subsequently fried in a 25 l deep fat frying installation filled with oil at 180–185° C. for 30 seconds and treated in a circulating hot air oven at 200° C. for 10 minutes. The breaded nuggets were dusted and dipped only once followed by a breading treatment. After 24 hours of cooling at −20° C. the nuggets were wrapped in poylthene bags and stored at −20° C.

All nugget coatings were evaluated for their resistance against sogginess by heating the nuggets in a microwave oven at 750W for 95 seconds, yielding a core temperature of 85–90° C. Each batch was weighted before and after heat treatment. The homogenity of heating, with a batch of nuggets, was checked by sticking a Pt-electrode in the nuggets after heating and this appeared to be sufficient. Organoleptic parameters were analyzed by an expert panel. As a reference for the crispness reference nuggets were heated in a circulating hot air oven for 10 minutes at 210° C. The nuggets were tested after cooling to approx. 50° C., suitable for consumption. Additionally the heated nuggets were placed under heating units (Salamandel, 400W) in a representative catering installation for 20 minutes and analyzed on sensorial and weight change parameters.

EXAMPLE 3

Fish Nuggets

The batter composition used for the coating of fish nuggets was the same as used for the comminuted beef as depicted in table V. The coal fish was purchased as filet. The filets were thawed and tumbled for in total 60 minutes over 6 hours time, while adding the processing aids and the complete farce preparation as depicted in table VIII.

TABLE VIII

Ingredients used for the fish fillings

| Farce ingredients: | [%] |
|---|---|
| Coal fish | 5.7 |
| Phosphate | 0.04 |
| Salt including 15% NaNO$_2$ | 0.25 |
| Water | 1.16 |
| Ascorbate | 0.002 |
| Potato Starch | 0.97 |
| Coal fish: | |
| Coal fish | 87.5 |
| Salt including 15% NaNO$_2$ | 0.76 |
| Phosphate | 0.17 |
| Ascorbate | 0.06 |
| Potato starch | 2.91 |
| Spices | 0.3 |
| Monosodiumglutamate | 0.17 |
| Rosemary | 0.06 |
| Total | 100 |

The farce was made by comminuting the fish with the processing aids as depicted in table VIII. The pretreated fish was vacuum packed and stored at −10° C. Subsequently the fish was pasteurized at 65° C. and stored at −2° C. The fish was cut into cubes just before battering. The nuggets were dusted and battered twice and fried for 30 seconds followed by a circulating hot air oven at 200° C. for 10 minutes. The freshly fish nuggets were frozen and stored at −40° C. The nuggets were evaluated as described for the comminuted beef nuggets, directly after heating and after storage under heating units.

What is claimed is:

1. A batter mix for the coating of food products, which batter mix comprises a genetically modified potato starch (GMPS), wherein the GMPS has an amylose content greater than 25%, and a phosphate content less than 85%, when compared to starch of non-genetically-modified potatoes.

2. A batter mix for the coating of food products, which batter mix comprises a genetically modified potato starch (GMPS) and wheat flour, and wherein the NMPS has an amylose content greater than 25%, and a phosphate content less than 85%, when compared to starch of non-genetically-modified potatoes.

3. The batter mix of claim 1, wherein the GMPS is present in an amount of about 5–60% (w/w) of the total amount of dry batter mix.

4. A process for the production of batter mix, which process comprises mixing genetically modified potato starch (GMPS) as defined in claim 1, together with batter-mix ingredients.

5. The method of coating food products, which method comprises coating the food products with the batter mix of claim 1.

6. The process of preparing food products characterized by having an improved crispness after microwaving before consumption, which process comprises preparing the food products by coating the food products with the batter mix of claim 1.

7. The method of coating food products, wherein the food products are coated with the batter mix of claim 1, and wherein the food products are selected from the group consisting of red-meats, poultry, fish, vegetables, fruits, mushrooms, and cheeses.

8. A food product coated by the batter mix of claim 1.

9. The food product of claim 8, wherein the food product is selected from the group consisting of red-meats, poultry, fish, vegetables, fruits, mushrooms, and cheeses.

* * * * *

UNITED STATES PATENT AND TRADEMARK OFFICE
CERTIFICATE OF CORRECTION

PATENT NO. : 6,475,541 B1
DATED : November 5, 2002
INVENTOR(S) : Ekhart et al.

It is certified that error appears in the above-identified patent and that said Letters Patent is hereby corrected as shown below:

Column 1,
Line 31, change "or" to -- For --.

Column 3,
Line 51, change "WO 91119806" to -- WO 9119806 --.
Line 53, change "WO 94128149" to -- WO 9428149 --.

Column 7,
Line 31, Table IV, change "45.6" to -- 48.6 --.

Column 10,
Line 38, change "NMPS" to -- GMPS --.

Signed and Sealed this

Thirteenth Day of May, 2003

JAMES E. ROGAN
*Director of the United States Patent and Trademark Office*